UNITED STATES PATENT OFFICE.

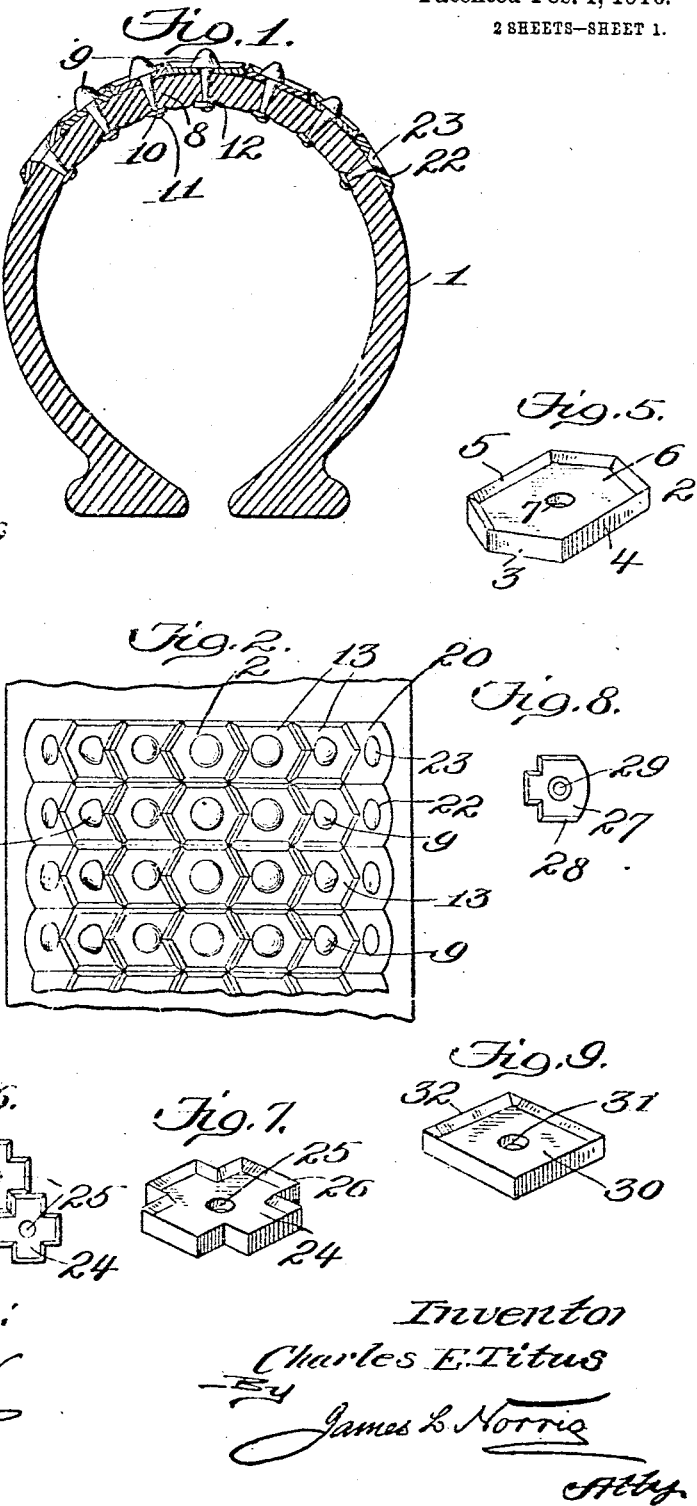

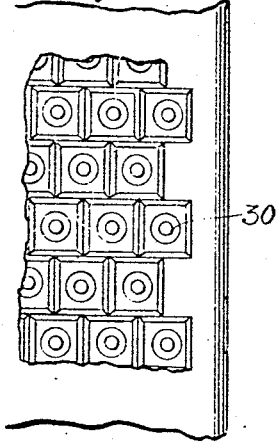
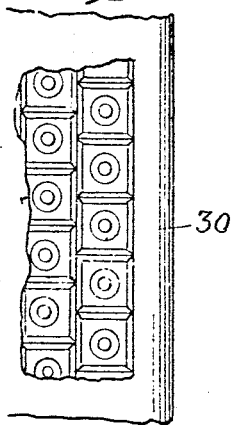
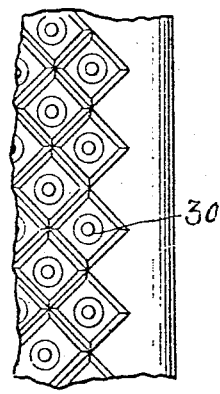
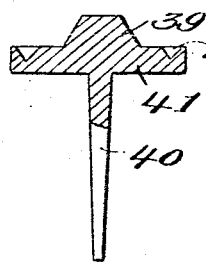
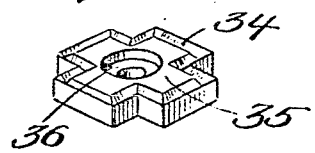
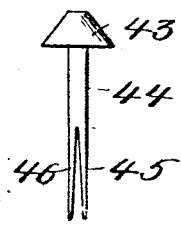
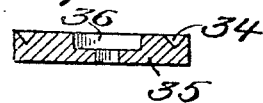
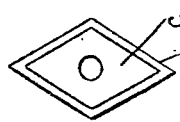
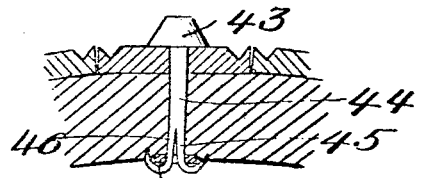

CHARLES E. TITUS, OF SPRINGFIELD, MASSACHUSETTS.

PNEUMATIC TIRE FOR VEHICLES.

948,193.  Specification of Letters Patent.  Patented Feb. 1, 1910.

Application filed July 20, 1907. Serial No. 384,805.

*To all whom it may concern:*

Be it known that I, CHARLES E. TITUS, a citizen of the United States, residing at Springfield, in the county of Hampden and State of Massachusetts, have invented new and useful Improvements in Pneumatic Tires for Vehicles, of which the following is a specification.

This invention relates to pneumatic or cushioned tires for vehicles, in which the propelling force is applied directly from the axle to the tread of the wheel; and the object thereof is to provide a tire with means, as hereinafter set forth, which acts as an armor for the tread of the tire, thereby reducing the wear thereof, as well as preventing puncturing and overcoming any liability of the tire skidding or side slipping.

Further objects of the invention are to provide an armor for the tread of a tire which shall be simple in its construction, having the elements thereof so set up as to be conveniently applied to the cover, strong, durable, efficient in its use and comparatively inexpensive to manufacture.

With the foregoing and other objects in view, the invention consists in the novel construction and arrangement of tread elements with respect to the tire cover, as hereinafter more specifically described and illustrated in the accompanying drawings, wherein is shown the preferred embodiment of an armor for the tread of a tire, but it is to be understood that changes, variations and modifications can be resorted to which come within the scope of the claims hereunto appended.

In describing the invention in detail reference is had to the accompanying drawings wherein like characters denote corresponding parts throughout the several views and in which—

Figure 1 is a cross section of a tire cover with the tread members connected thereto to constitute an armor for the cover; Fig. 2 is a top plan view showing an armor constructed of a series of tread members of one form; Fig. 3 is a perspective view of one of the tread members shown in Fig. 2; Fig. 4 is a longitudinal sectional view thereof; Fig. 5 is a perspective view of another of the tread elements as shown in Fig. 2; Fig. 6 is a plan showing a plurality of tread members of a modified form arranged to constitute an armor; Fig. 7 is a perspective view of one of the tread members shown in Fig. 6; Fig. 8 is a perspective view of one of the tread members employed in the outer row of elements when the armor is constructed from the tread members shown in Fig. 7; Fig. 9 is a perspective view of another form of tread member; Figs. 10 and 11 are plan views showing a plurality of tread members of the form illustrated in Fig. 9 arranged to constitute an armor; Fig. 12 is a like view showing a different arrangement of members similar to that shown in Fig. 9; Fig. 13 is a perspective view of a modified form of tread member; Fig. 14 is a section of the member shown in Fig. 13; Fig. 15 illustrates in section another modified form of tread member; Fig. 16 illustrates another form; Fig. 17 illustrates a tread nail having its shank split, and, Fig. 18 is a sectional view showing the manner in which the tread nail secures the tread member to the cover.

Referring to the drawings by reference characters, the armor for the cover 1 of the tire is formed from a series of tread members termed "tread reinforcing members," each of which is secured to the cover through the medium of a tread nail, and preferably formed of metal.

Referring to Fig. 2 of the drawings, the tread members which form the central row of the tire are indicated by the reference character 2.

In Fig. 5 the construction of the tread members 2 is clearly shown and each of these members has pointed ends 3, straight sides 4 and a beveled ridge 5 extending entirely around the upper face 6 of the member. The ridge 5 conforms in contour to the shape of the member. The member 2 is furthermore provided with an opening 7 through which extends the shank 8 of a tread nail. The nail is formed with a rounded head 9 and the shank 8 extends through the cover 1 and has its inner end bent around a retaining strip 10 which prevents withdrawal of the tread nail. The bent end of this shank 8 is indicated by the reference character 11 and extends into the inner face of the cover as indicated at 12.

The tread members of the other rows of the armor, with the exception of the members of the outer rows, are indicated by the reference character 13. The construction of the members 13 is clearly shown in Fig. 3 and each of them is formed with a pointed end 14, a V-shaped end 15 and straight sides 16. Extending entirely around the upper face 17 of the member 13 is a beveled edge 18, which conforms in contour to the shape of the member 13. The latter is formed with an opening 19 through which extends a tread nail for securing it in position in the same manner as that referred to with respect to the members 2. The V-shaped end 15 of each of the members 13 which are arranged at the sides of the members 2, is adapted to receive a pointed end 3 of a member 2 so that the members 13 will interengage with the members 2. The members 13 which are arranged alongside of each other are so disposed that one of the members 13 will have its V-shaped end receive the pointed end 14 of an adjacent member so that the said members 13 will interengage. The tread members of the outer rows of the armor are indicated by the reference character 20 and are each provided with a V-shaped end adapted to receive a pointed end 14 of the member 13. The members 20 are flat upon their upper faces, or in other words are not provided with a bead. Each of the members 20 is furthermore provided with a countersunk opening 22 to receive a head 23 of a tread nail. The tread nails for the members 20 are secured to the cover in the same manner as the tread nails of the members 2. The tread member 20 gives support to the inner rows of tread members in case of the heads of the tread nails abutting against stones or glancing off of stones or other obstructions.

The tread members as shown in Figs. 6 and 7 are substantially cruciform in contour and are each indicated by the reference character 24. Each of the members is formed with a centrally-arranged opening 25 through which is adapted to extend a tread nail for securing the member in position. Each of the members 24 is furthermore provided on its upper face with a beveled ridge 26 which extends entirely around the margin thereof. The members 24 when set up are adapted to interengage with one another in a manner as shown in Fig. 6.

In Fig. 8 is shown a tread member indicated by the reference character 27. Such form of tread member is used for the outer rows of tread members when the armor is formed from the interengaging of a plurality of tread members 24. The tread members 27 are not provided with a beveled bead on the upper face, but such members are cruciform in contour and one side, as at 28, tapers off. Each of the tread members 27 is formed with a countersunk opening 29 to receive the head of a tread nail. The members 27 as well as the members 24, are secured to the tire cover in the same manner as the members 2.

In Fig. 9 a modified form of tread member is shown which is substantially square in contour and is indicated by the reference character 30. The member is formed with an opening 31 through which extends a tread nail and the member is furthermore provided with a beveled bead 32 extending around the margin thereof.

The interengaging of the tread members with each other prevents the outer rows of tread members from tearing out if the tire should ride hard on a stone, bringing the strain on the outer rows of tread members, and owing to the fact that the tread members do interengage it helps to equalize the strain. The projecting ends of the tread nails act as a means to prevent skidding or slipping, and furthermore the beveled ridges of the members tend to slew obstructions off the members during the travel of the wheel and also tend to slew an obstruction against the face of the tread members.

The tread members being separate elements, each of which is free to act and move with the tire body, thus allow perfect resiliency, and, furthermore an armor constructed in a manner as set forth obtains perfect traction, no heating from friction, insures durability to the tire or the tire cover and overcomes any liability of puncturing the tread of the tire, as well as preventing skidding or side slipping.

In Figs. 10 and 11 the armor is shown as formed of a plurality of tread members constructed similar to that shown in Fig. 9, the tread members being so disposed as to break the joints.

In Fig. 12 the armor is shown as consisting of a plurality of tread members similar to the construction shown in Fig. 9 and diagonally disposed with respect to each other.

In Fig. 13 a modified form of tread member is shown which is substantially cruciform in contour and has its upper face formed with a groove with the wall thereof substantially V-shaped as at 34. The element is referred to by the reference character 35 and is formed with a countersunk opening 36 to receive the head of a tread nail.

In Fig. 16 is shown a tread member substantially diamond-shaped in contour and which is indicated by the reference character 37. The upper face of said member 37 is provided with a groove 38 which extends entirely around the margin thereof.

Fig. 15 shows the providing of a tread member with a truncated portion 39 approximately centrally thereof and further shows the forming of a shank 40 integral with the member which is indicated by the reference character 41. The member has a groove 42 upon its upper face. The form shown in Fig. 15 is used when it is not desired to employ separate tread nails. The shank 40 is connected in the same manner as that hereinbefore referred to.

In Figs. 17 and 18 a tread nail construction is shown which embodies a conical-shaped head 43, a shank 44, the latter having its free end split to form prongs 45, 46. When the shank 44 is inserted through the tire cover the prongs 45 46 are clenched around a washer 47 which securely connects the tread nail to the cover.

What I claim is—

1. An armor for pneumatic tires comprising a plurality of separate tread members, and means for fastening each tread member separately to the tread portion of the tire, said tread members being arranged in conterminous relation in parallel rows and intermatching throughout the series, thereby presenting a continuous unbroken armored surface, said members also having edges formed with beveled ridges which abut the ridges of the adjacent members and form therewith projections having inclined sides.

2. An armor for pneumatic tires comprising a plurality of straight edged separate tread members having projecting ridges circumscribing their edges and means for securing each member separately to the tire, the members being arranged as a series to present an unbroken armored tread area.

3. An armor for pneumatic tires comprising a plurality of separate tread members and means for fastening each tread member separately to the tread portion of the tire, said tread members having opposite ends of wedge and reëntrant angle formation, the wedge end of one member fitting into the reëntrant edge of the other member, said members also having edges formed with beveled ridges which abut the ridges of the adjacent members and form therewith projections having inclined sides.

4. An armor for pneumatic tires comprising a plurality of similarly shaped tread units, each having straight edges bounded by a conformably shaped outwardly projecting ridge having a perpendicular outer face and a beveled inner face.

5. An armor for pneumatic tread units comprising a plurality of tread units arranged to present a continuous unbroken armored surface and having as a series, angularly disposed, outwardly projecting and tapering ridges associated therewith.

In testimony whereof I have hereunto set my hand in presence of two subscribing witnesses.

CHARLES E. TITUS.

Witnesses:
 JOHN TORREY HAWKINS.
 TREFFLE MARSAM.